(12) United States Patent  
Harpster

(10) Patent No.: US 9,319,449 B2  
(45) Date of Patent: Apr. 19, 2016

(54) METHOD, APPARATUS, AND COMPUTER PROGRAM PRODUCT FOR PROCESSING DATA REQUESTS

(75) Inventor: Todd Harpster, Eagan, MN (US)

(73) Assignee: McKesson Financial Holdings, Hamilton (BM)

( * ) Notice: Subject to any disclaimer, the term of this patent is extended or adjusted under 35 U.S.C. 154(b) by 743 days.

(21) Appl. No.: 13/537,534

(22) Filed: Jun. 29, 2012

(65) Prior Publication Data

US 2014/0006475 A1    Jan. 2, 2014

(51) Int. Cl.
| | |
|---|---|
| *G06F 15/16* | (2006.01) |
| *H04L 29/08* | (2006.01) |
| *G06F 17/30* | (2006.01) |
| *H04L 29/06* | (2006.01) |

(52) U.S. Cl.
CPC .......... *H04L 67/02* (2013.01); *G06F 17/30861* (2013.01); *H04L 63/20* (2013.01); *H04L 67/2804* (2013.01)

(58) Field of Classification Search
CPC ... G06F 17/30; G06F 17/30861; H04L 12/56; H04L 29/06
USPC ........................................................ 709/202
See application file for complete search history.

(56) References Cited

U.S. PATENT DOCUMENTS

| 6,055,236 | A * | 4/2000 | Nessett | ............. | H04L 29/12009 |
|---|---|---|---|---|---|
| | | | | | 370/389 |
| 7,653,634 | B2 | 1/2010 | Mathur | | |
| 2002/0107743 | A1 * | 8/2002 | Sagawa | .................. | G06Q 10/10 |
| | | | | | 705/17 |
| 2004/0015368 | A1 * | 1/2004 | Potter | ..................... | H04L 67/10 |
| | | | | | 709/201 |
| 2005/0027818 | A1 * | 2/2005 | Friedman | ................ | H04L 29/06 |
| | | | | | 709/217 |
| 2005/0063335 | A1 * | 3/2005 | Shenfield | ............ | H04M 3/4938 |
| | | | | | 370/329 |
| 2008/0178278 | A1 * | 7/2008 | Grinstein | ............ | H04L 63/0227 |
| | | | | | 726/12 |
| 2013/0275492 | A1 * | 10/2013 | Kaufman | .............. | H04L 63/029 |
| | | | | | 709/203 |

OTHER PUBLICATIONS

Cloud Gateway to Private Data Center, Mar. 8, 2012.*
"Cloud Gateway to Private Data Center"; Dated Mar. 8, 2012; pp. 1-4.
Christian Weyer's Blog; "When you think things are not possible: WCF duplex callbacks through NATs and firewalls—safe and secure"; dated Apr. 27, 2007; pp. 1-9.
"HTTP Tunnel"; Networking Products for Corporation Communications; Downloaded from http://www.http-tunnel.com/html/ on Aug. 20, 2012; 1 Page.
"Reverse HTTP"; Downloaded from http://reversehttp.net/reverse-http-spec.html on Aug. 20, 2012; pp. 1-12.

* cited by examiner

*Primary Examiner* — Hee Soo Kim
(74) *Attorney, Agent, or Firm* — Alston & Bird LLP

(57) ABSTRACT

A method for managing data requests is provided. Two asynchronous processes are provided for managing communication with a requestor and an agent via a gateway server. The method may include receiving a request and agent identifier from a requesting web application and generating a correlation identifier to associate with the request. The request and correlation identifier may be routed to a registered agent of a private data center. A response may be returned and routed to the requestor based on the correlation identifier. Corresponding apparatuses and computer program products are also provided.

10 Claims, 6 Drawing Sheets

METHOD, APPARATUS, AND COMPUTER PROGRAM PRODUCT FOR PROCESSING DATA REQUESTS

TECHNOLOGICAL FIELD

Embodiments of the present invention relate generally to computer technology and, more particularly, relate to methods, apparatuses, and computer program products for processing data requests.

BACKGROUND

The widespread use of modern computing technology has led to an increasing demand for data to be made readily accessible by web applications via the internet. As the amount of data collected and stored in private databases continues to increase, so does the need for efficient and secure methods to retrieve such data. Some institutions may access third party servers or data centers in order to fully utilize available data and improve upon web applications offered to clients.

Some methods for data retrieval from private data centers may not fully meet demands for efficient and secure data retrieval. Some may introduce security vulnerabilities, putting customer data at risk to hackers or the like. Some techniques may not be able to withstand the volume demanded by requesting web applications, and the efficiency or performance of a system may consequently decline during peak usage.

BRIEF SUMMARY OF SOME EXAMPLE EMBODIMENTS

Methods, apparatuses, and computer program products are therefore provided for processing data requests. A method is provided for receiving a request and an agent identifier from a requestor, generating a correlation identifier associated with the request, routing the request and associated correlation identifier to an agent associated with the agent identifier, receiving an agent response comprising an answer and a correlation identifier, and routing the answer of the agent response to a requestor based on the correlation identifier. The receiving a request, generating a correlation identifier, and routing an answer may be performed asynchronously from routing the request and receiving an agent response.

In some embodiments, the method includes adding the request, agent identifier, and associated correlation identifier as a request item to a request queue, and routing the request includes retrieving the request item from the request queue, and transmitting the request and associated correlation identifier of the request item to an agent associated with the agent identifier. In some embodiments, the request queue is associated with an agent.

According to some embodiments, the method includes adding the agent response to a response queue, and routing the answer includes retrieving the agent response from a response queue, and transmitting the answer associated with the agent response to a requestor based on the correlation identifier associated with the agent response. In some embodiments, the agent response further comprises a security certificate identifying a registered agent.

In some embodiments, the method includes comprising transmitting an error response to a requestor in an instance when a response to a request is not received within a specified time limit and/or an agent identifier is not registered. According to some embodiments, the request and associated correlation identifier may be routed to the agent in the form of a hypertext transfer protocol secure response, in response to a polling hypertext transfer protocol secure request received from the agent. The agent response is received as a hypertext transfer protocol secure request.

In some embodiments, the request and associated correlation identifier may be routed to the agent via a WebSocket connection and the agent response may be received via the Web Socket connection. The agent identifier may comprise at least one of a customer identifier, application name, or service name.

A computer program product is provided, including at at least one non-transitory computer-readable medium having computer-readable program instructions stored therein, the computer-readable program instructions comprising instructions. The instructions, when performed by an apparatus, are configured to cause the apparatus to receive a request and an agent identifier from a requestor, generate a correlation identifier associated with the request, route the request and associated correlation identifier to an agent associated with the agent identifier, receive an agent response comprising an answer and a correlation identifier, and route the answer of the agent response to the requestor based on the correlation identifier. The receiving a request, generating a correlation identifier, and routing an answer is performed asynchronously from the routing the request and receiving an agent response.

In some embodiments, the instructions may cause the apparatus to add the request, agent identifier, and associated correlation identifier as a request item to a request queue. Routing the request includes retrieving the request item from the request queue and transmitting the request and associated correlation identifier of the request item to an agent associated with the agent identifier.

In some embodiments, the instructions further cause the apparatus to add the agent response to a response queue. Routing the answer may include retrieving the agent response from the response queue, and transmitting the answer associated with the agent response to the requestor based on the correlation identifier associated with the agent response.

In some embodiments, a method is provided including managing communication with a requestor asynchronously from managing communication with an agent. Managing communication with the requestor may include receiving a request and an agent identifier from a requestor, generating, by a processor, a correlation identifier associated with the request, determining that an agent response comprising the correlation identifier has been received, and routing an answer associated with the agent response to the requestor. Managing communication with the agent may include determining that a request comprising an agent identifier associated with the agent has been received, routing the request and an associated correlation identifier to the agent, and receiving an agent response comprising an answer and the correlation identifier.

In some embodiments, managing communication with the requestor further comprises adding the request, agent identifier, and associated correlation identifier as a request item to a request queue, and routing the request comprises retrieving the request item from the request queue, and transmitting the request and associated correlation identifier of the request item to an agent associated with the agent identifier.

In some embodiments, managing communication with the agent further comprises adding the agent response to a response queue, and routing an answer comprises retrieving the agent response from the response queue and transmitting the answer associated with the agent response to the requestor based on the correlation identifier associated with the agent response.

According to some embodiments, an apparatus for processing data requests is provided, the apparatus comprising processing circuitry configured to manage communication with a requestor. The processing circuitry may be configured to cause the apparatus to receive a request and an agent identifier from a requestor, generate a correlation identifier associated with the request, determine that an agent response comprising the correlation identifier has been received, and route an answer associated with the agent response to the requestor. The processing circuitry may be further configured to manage communication with an agent, causing the apparatus to determine that a request comprising an agent identifier associated with the agent has been received, route the request and an associated correlation identifier to the agent, and receive an agent response comprising an answer and the correlation identifier.

In some embodiments, the processing circuitry configured to manage communication with the requestor may be further configured to cause the apparatus to at least add the request, agent identifier, and associated correlation identifier as a request item to a request queue. The processing circuitry configured to manage communication with the agent may be further configured to cause the apparatus to at least retrieve the request item from the request queue and transmit the request and associated correlation identifier of the request item to an agent associated with the agent identifier.

In some embodiments, the processing circuitry configured to manage communication with the agent may be further configured to cause the apparatus to at least add the agent response to a request queue. The processing circuitry configured to manage communication with the requestor may be further configured to cause the apparatus to retrieve the agent response from the response queue and transmit the answer associated with the agent response to the requestor based on the correlation identifier associated with the agent response.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE SEVERAL VIEWS OF THE DRAWINGS

Figure 1:
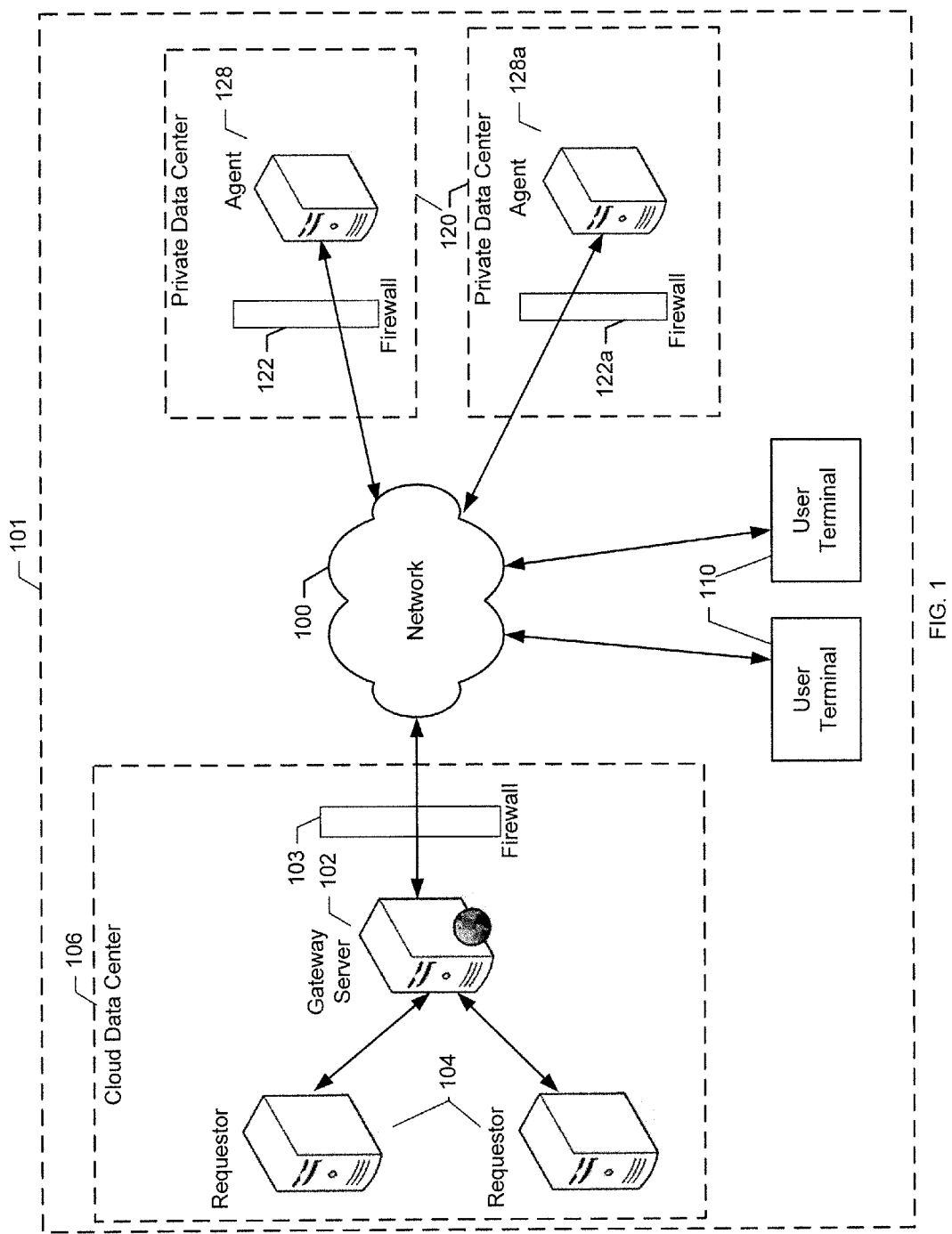
Figure 2:
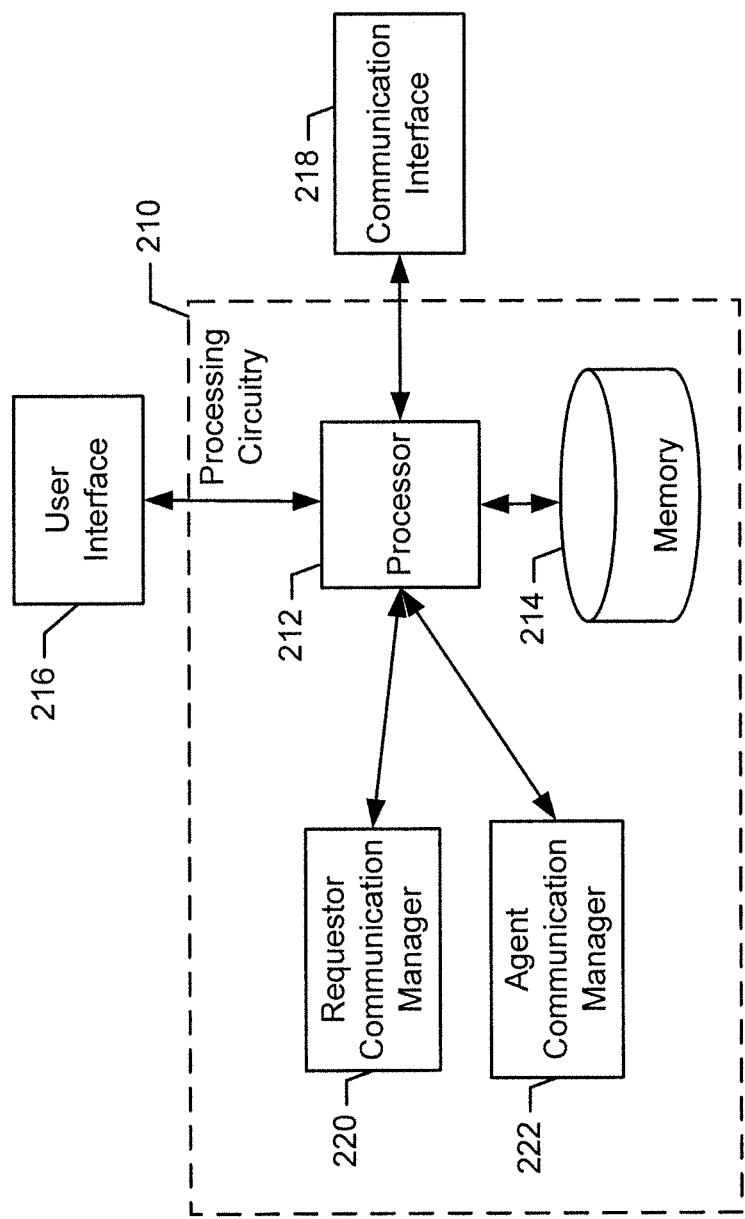
Figure 3A:
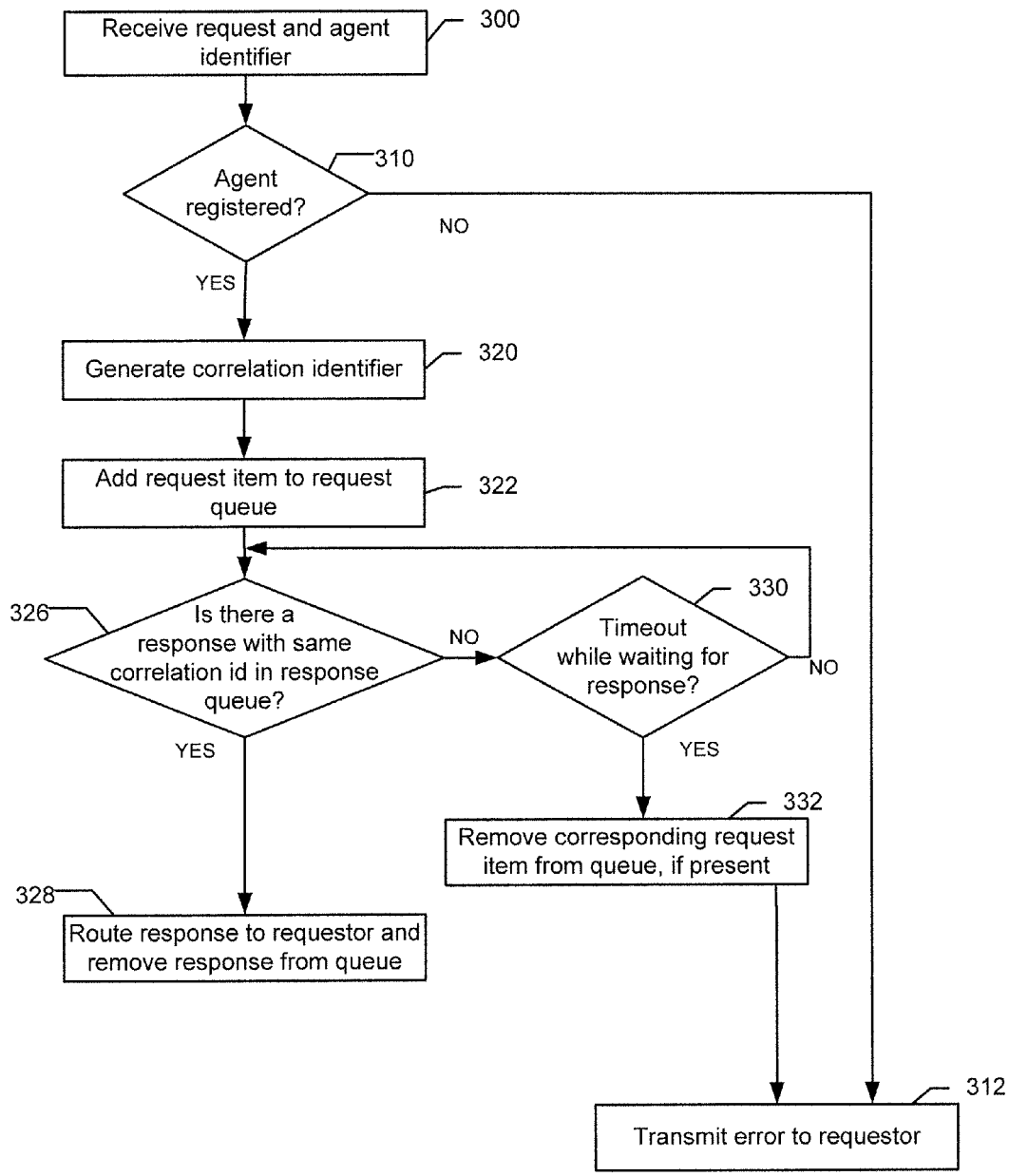
Figure 3B:
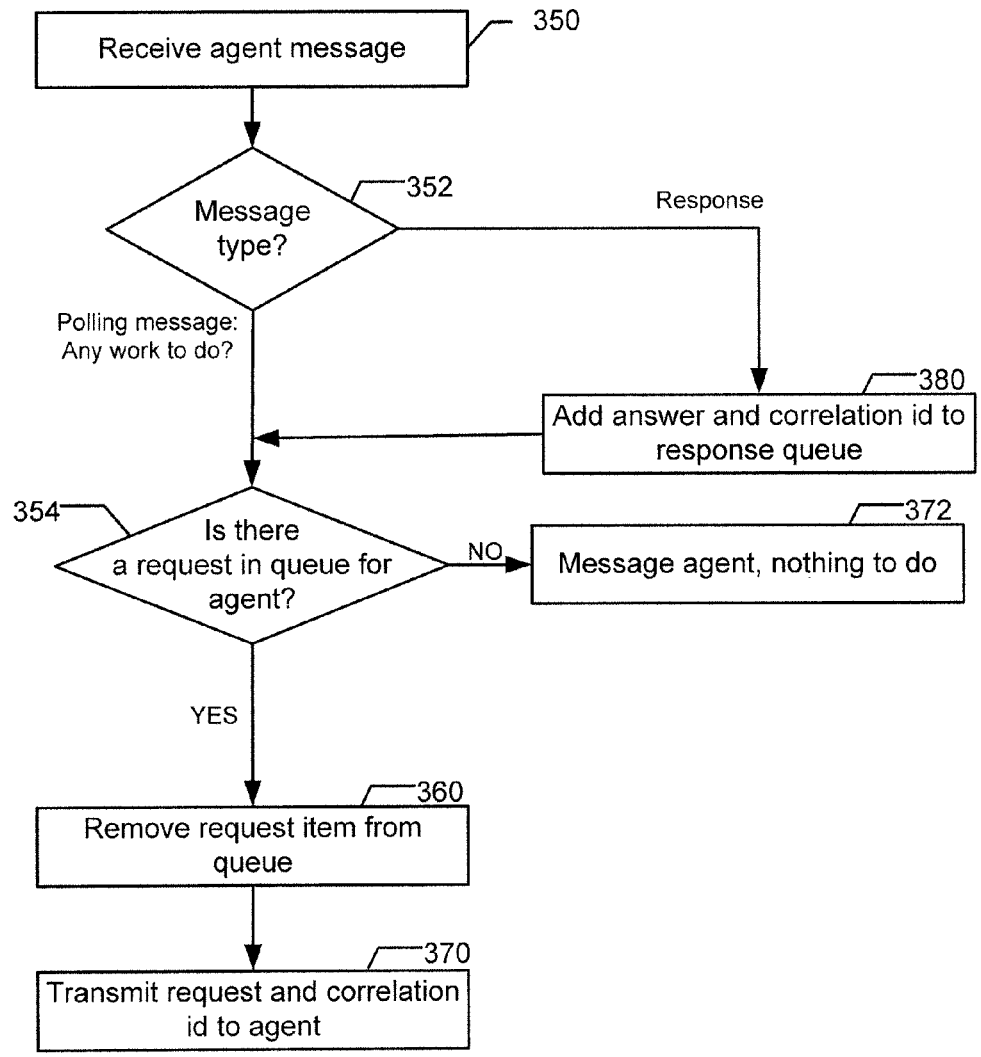
Figure 4:
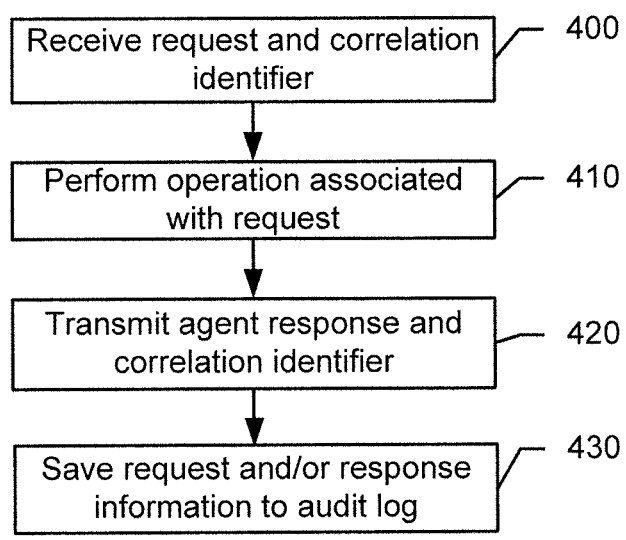
Figure 5:
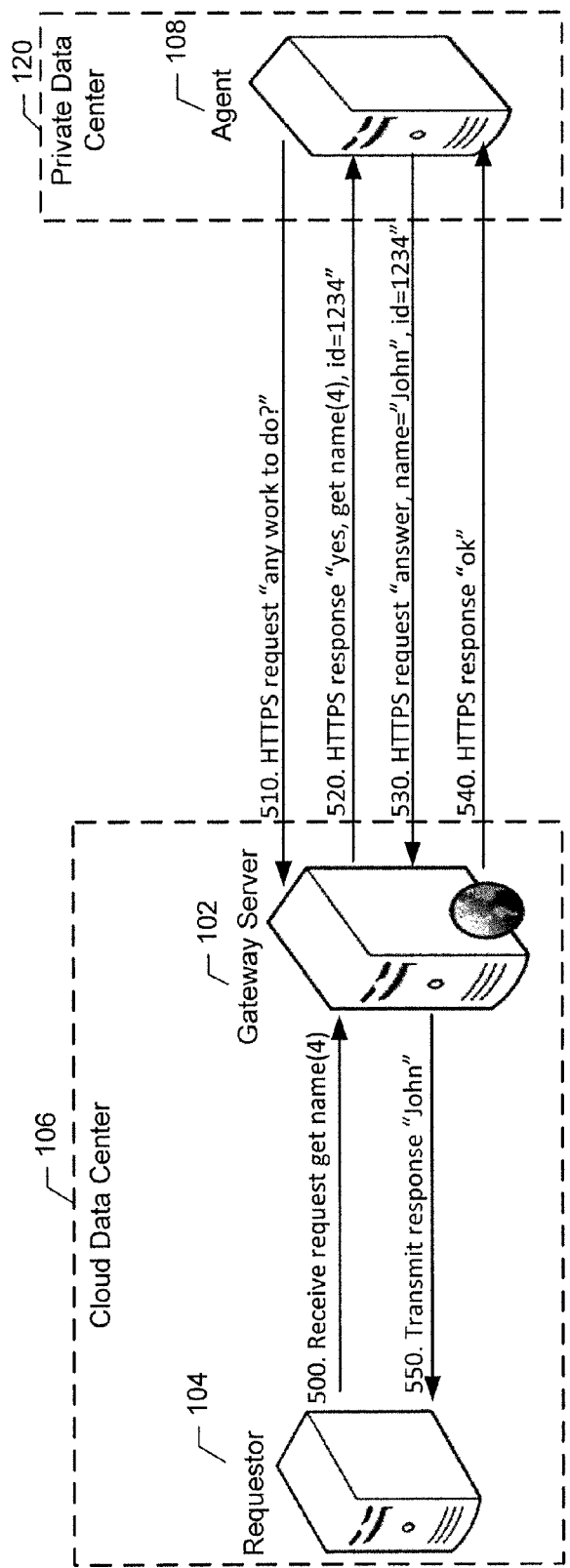

Having thus described embodiments of the invention in general terms, reference will now be made to the accompanying drawings, which are not necessarily drawn to scale, and wherein:

FIG. 1 illustrates a system for accessing a private data center according to some example embodiments;

FIG. 2 is a block diagram of a gateway server apparatus in accordance with some example embodiments;

FIGS. 3A, 3B and 4 illustrate flowcharts according to some example embodiments; and FIG. 5 is a diagram illustrating operations according to an example embodiment.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, where a computing device is described herein to receive data from another computing device, it will be appreciated that the data may be received directly from the other computing device and/or may be received indirectly via one or more intermediary computing devices, such as, for example, one or more servers, relays, routers, network access points, and/or the like. Similarly, where a computing device is described herein to transmit data to other computing device, it will be appreciated that the data may be sent directly to the other computing device or may be sent to the other computing device via one or more interlinking computing devices, such as, for example, one or more servers, relays, routers, network access points, and/or the like.

FIG. 1 illustrates a system 101 for managing data requests initiated in a cloud data center according to some example embodiments. It will be appreciated that the system 101 as well as the illustrations in other figures are each provided as an example of an embodiment(s) and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for accessing a private data center, numerous other configurations may also be used to implement embodiments of the present invention.

The system 101 may include a cloud data center 106, comprising a gateway server 102, any number of requestors 104, and/or a firewall 103. For the purpose of simplicity, example embodiments described herein will consider the requestor(s) 104 to be an application server; however, it will be appreciated that the requestor may be any apparatus requesting access to a private data center. In this regard, requestor(s) 104 may support and/or provide application code written in a variety of languages. Requestor(s) 104 may be any type of computer program or component running in the Cloud data center. Cloud data center 106 may comprise any number of requestor(s) 104 and the any number of requestor(s) 104 may be implemented using any combination of languages and/or platforms. Although not illustrated in FIG. 1, cloud data center 106 may further comprise any number of web servers. The web server(s) may be accessed via network 100 and communicate with requestor(s) 104 and/or gateway server 102. A request to access a web server may be generated from a user terminal 110 and may cause requestor(s) 104 to generate a request as described herein.

Gateway server 102 may be an apparatus configured to manage data requests received from requestor(s) 104 via any of a variety of communication methods dependent upon the configuration of the cloud data center 106. For example, in embodiments in which a gateway server 102 is disposed remotely from requestor(s) 104, data requests may be provided to the gateway server 102 via an internal network, local area network (LAN), or any other type of network connection. In some example embodiments, requestor(s) 104 may be directly connected to gateway server 102. In some embodiments, various requestor(s) 104 may be connected to gateway server 102 using a variety of communication methods.

Regardless of its connection to requestor(s) 104, gateway server 102 may be connected to a network 100, by a variety of connections, to access private data center(s) 120. Network 100 may be embodied in a local area network, the Internet, any other form of a network, or in any combination thereof, including proprietary private and semi-private networks and public networks. The network 100 may comprise a wired network, wireless network (e.g., a cellular network, wireless local area network, wireless wide area network, some combination thereof, or the like), or a combination thereof, and in some example embodiments comprises at least a portion of the Internet. In some embodiments, cloud data center 106 may comprise a firewall 103 to protect the cloud data center 106 from unauthorized transmissions in and out of the cloud data center 106. Firewall 103 may be implemented on the same apparatus as gateway server 102, or may be removed from gateway server 102. In some embodiments, a firewall 103 may not be present.

In some example embodiments, gateway server 102 may be embodied as or comprise one or more computing devices. In some example embodiments, gateway server 102 may be implemented as a distributed system or a cloud based entity that may be implemented within network 100. In this regard, gateway server 102 may comprise one or more servers, a server cluster, one or more network nodes, a cloud computing infrastructure, some combination thereof, or the like. In some embodiments, gateway server 102 may be implemented in the same apparatus as one or more requestor(s) 104.

Additionally or alternatively, in some example embodiments, gateway server 102 may be implemented as a web service or otherwise comprise a web service. It will be appreciated that implementing gateway server 102 as a web service is cited as a non-limiting example, and should not be construed to narrow the scope or spirit of the disclosure in any way. An example embodiment of gateway server 102 is illustrated in FIG. 2 and is described in further detail hereinafter.

Continuing with FIG. 1, system 101 may also include one or more private data center(s) 120. Private data center(s) 120 may be operated by a third party and/or administered independently from cloud data center 106. A private data center(s) 120 may comprise one or more servers, a server cluster, one or more network nodes, a cloud computing infrastructure, some combination thereof, or the like. Additionally or alternatively, private data center 120 may be protected by a firewall such as firewall 122 or 122a, which may be implemented on any apparatus within private data center 120. A private data center 120 may comprise any number of agents, such as 128 and 128a, which may be configured to communicate with gateway server 102 via network 100. Within a single private data center 120 there may be any number of agents. For simplicity sake, example embodiments described herein will refer to agent 128 or agent(s) 128, which may be indicative of any of the agent(s) 128, 128a, etc. An agent 128 may be an application server, database, or any apparatus configured to access data within the private data center. An example embodiment of an agent(s) 128 is illustrated in FIG. 2 and is described in further detail hereinafter.

Continuing with FIG. 1, system 101 may additionally and optionally comprise any number of user terminals 110, which may, for example, be embodied as a laptop computer, tablet computer, mobile phone, desktop computer, workstation, or other like computing device. A user terminal 110 may be remote from the cloud data center 106 and/or private data center(s) 120, in which case the user terminal 110 may communicate with any of the respective apparatuses via network 100. Additionally or alternatively, the user terminal 110 may be implemented on cloud data center 106 and/or private data center(s) 120. User terminal(s) 110 may be used to access a web application, for example, in communication with requestor(s) 104. Communication between user terminal(s) 110 and requestor(s) 104 may occur via network 100 and/or gateway server 102.

FIG. 2 illustrates a gateway server 102 and or agent(s) 128 in further detail, in accordance with some example embodiments. However, it should be noted that the components, devices, and elements illustrated in and described with respect to FIG. 2 below may not be mandatory and thus some may be omitted in certain embodiments. For example, while FIG. 2 illustrates a requestor communication manager 220 and an agent communication manager 222, as described in more detail below, these components may be associated with the gateway server 102, but not the agent(s) 128. Additionally, some embodiments may include further or different components, devices, or elements beyond those illustrated in and described with respect to FIG. 2.

Continuing with FIG. 2, processing circuitry 210 may be configured to perform actions in accordance with one or more example embodiments disclosed herein. In this regard, the processing circuitry 210 may be configured to perform and/or control performance of one or more functionalities of the gateway server 102 and/or agent(s) 128 in accordance with various example embodiments. The processing circuitry 210 may be configured to perform data processing, application execution, and/or other processing and management services according to one or more example embodiments. In some embodiments, the gateway server 102, agent(s) 128, or a portion(s) or component(s) thereof, such as the processing circuitry 210, may be embodied as or comprise a circuit chip. The circuit chip may constitute means for performing one or more operations for providing the functionalities described herein.

In some example embodiments, the processing circuitry 210 may include a processor 212 and, in some embodiments, such as that illustrated in FIG. 2, may further include memory 214. The processing circuitry 210 may be in communication with or otherwise control a requestor communication manager 220, an agent communication manager 222, user interface 216, and/or a communication interface 218. As such, the processing circuitry 210 may be embodied as a circuit chip (e.g., an integrated circuit chip) configured (e.g., with hardware, software, or a combination of hardware and software) to perform operations described herein.

The processor 212 may be embodied in a number of different ways. For example, the processor 212 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. Although illustrated as a single processor, it will be appreciated that the processor 212 may comprise a plurality of processors. The plurality of processors may be in operative communication with each other and may be collectively configured to perform one or more functionalities of gateway server 102 and/or agent(s) 128 as described herein. The plurality of processors may be embodied on a single computing device or distributed across a plurality of computing devices collectively configured to function as the gateway server 102 and/or agent(s) 128. In some example embodiments, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA, or the like, the processor 212 may be specifically configured hardware for conducting the operations described herein. Alternatively, as another example, when the processor 212 is embodied as an executor of software instructions, the instructions may specifically configure the processor 212 to perform one or more operations described herein.

In some example embodiments, the memory 214 may include one or more non-transitory memory devices such as, for example, volatile and/or non-volatile memory that may be either fixed or removable. In this regard, the memory 214 may comprise a non-transitory computer-readable storage medium. It will be appreciated that while the memory 214 is illustrated as a single memory, the memory 214 may comprise a plurality of memories. The plurality of memories may be embodied on a single computing device or may be distributed across a plurality of computing devices collectively configured to function as the gateway server 102 and/or agent(s) 128. The memory 214 may be configured to store information, data, applications, instructions and/or the like for enabling the gateway server 102 and/or agent(s) 128 to carry out various functions in accordance with one or more example embodiments. For example, the memory 214 may be configured to buffer input data for processing by the processor 212. Additionally or alternatively, the memory 214 may be configured to store instructions for execution by the processor 212. As yet another alternative, the memory 214 may include one or more databases that may store a variety of files, contents, or data sets. Among the contents of the memory 214, applications may be stored for execution by the processor 212 to carry out the functionality associated with each respective application. In some cases, the memory 214 may be in communication with one or more of the processor 212, user interface 216, and/or communication interface 218, for passing information among components of gateway server 102 and/or agent(s) 128.

The user interface 216 may be in communication with the processing circuitry 210 to receive an indication of a user input at the user interface 216 and/or to provide an audible, visual, mechanical, or other output to the user. As such, the user interface 216 may include, for example, a keyboard, a mouse, a joystick, a display, a touch screen display, a microphone, a speaker, and/or other input/output mechanisms. As such, the user interface 216 may, in some example embodiments, provide means for user control of managing or processing data access operations and/or the like. In some example embodiments in which the gateway server 102 and/or agent(s) 128 is embodied as a server, cloud computing system, or the like, aspects of user interface 216 may be limited or the user interface 216 may not be present. In some example embodiments, one or more aspects of the user interface 216 may be implemented on a user terminal 110. Accordingly, regardless of implementation, the user interface 216 may provide input and output means in accordance with one or more example embodiments.

The communication interface 218 may include one or more interface mechanisms for enabling communication with other devices and/or networks. In some cases, the communication interface 218 may be any means such as a device or circuitry embodied in either hardware, or a combination of hardware and software that is configured to receive and/or transmit data from/to a network and/or any other device or module in communication with the processing circuitry 210. By way of example, the communication interface 218 may be configured to enable gateway server 102 to communicate with requestor(s) 104, and/or agent(s) 128 via network 100. Accordingly, the communication interface 218 may, for example, include supporting hardware and/or software for enabling wireless and/or wireline communications via cable, digital subscriber line (DSL), universal serial bus (USB), Ethernet, or other methods.

Gateway server 102 may include, in some embodiments, a requestor communication manager 220 configured to perform functionalities associated with communicating with a requestor(s) 104, as described herein. Processor 212 (or the processing circuitry 210) may be embodied as, include, or otherwise control the requestor communication manager 220. As such, the requestor communication manager 220 may be embodied as various means, such as circuitry, hardware, a computer program product comprising computer readable program instructions stored on a computer readable medium (for example, the memory 214) and executed by a processing device (for example, the processor 212), or some combination thereof. Requestor communication manager 220 may be capable of communication with one or more of the processor 212, memory 214, user interface 216, and communication interface 218 to access, receive, and/or send data as may be needed to perform one or more of the functionalities of the requestor communication manager 220 as described herein.

Gateway server 102 may further include, in some embodiments, an agent communication manager 222 configured to perform functionalities associated with communication with an agent(s) 128, as described herein. Processor 212 (or the processing circuitry 210) may be embodied as, include, or otherwise control the agent communication manager 222. As such, the agent communication manager 222 may be embodied as various means, such as circuitry, hardware, a computer program product comprising computer readable program instructions stored on a computer readable medium (for example, the memory 214) and executed by a processing device (for example, the processor 212), or some combination thereof. Agent communication manager 222 may be capable of communication with one or more of the processor 212, memory 214, user interface 216, and communication interface 218 to access, receive, and/or send data as may be needed to perform one or more of the functionalities of the agent communication manager 222 as described herein. In some example embodiments in which the gateway server 102 is embodied as a server cluster, cloud computing system, or the like, requestor communication manager 220 and agent communication manager 222 may be implemented on different apparatuses.

FIGS. 3A, 3B and 4 are flowcharts of operations according to some example embodiments. Operations illustrated in FIGS. 3A, 3B, and 4 may be performed respectively by a gateway server 102 and/or agent(s) 128, and, more particularly, may be performed by, with the assistance of, and/or under the control of one or more of the processing circuitry 210, processor 212, memory 214, user interface 216 and/or communication interface 218. FIGS. 3A and 3B illustrate operations that may be performed by requestor communication manager 220 and agent communication manger 222, respectively. FIG. 4 illustrates operations that may be performed by processor 212 of agent 128. The communication interface 218 of both the gateway server 102 and/or agent 128 may be used to communicate between gateway server 102 and agent 128 over network 100.

Turning to FIG. 3A, a process by which gateway server 102 may manage communication to and from requestor(s) 104 in accordance with one embodiment of the invention is illustrated. At operation 300, requestor communication manager 220, for example, may receive a request and agent identifier from a requestor 104 via communication interface 218. The request may comprise a request for retrieval of data stored in a private data center, a request to update and/or save data in the private data center, and/or the like. The agent identifier may be any identifier sent by requestor 104 that may be interpreted by gateway server 102 to identify the agent 128 as the intended recipient of the request. As such, an agent identifier may comprise a customer identifier, particularly in instances where gateway server 102 is configured to communicate with private data center(s) 120 administered by various third parties. In some embodiments, an agent identifier may comprise a customer-agent pair, including a customer identifier, and agent identifier. This may be particularly advantageous in instances where a customer's private data center 120 comprises more than one agent 128. Additionally or alternatively, an agent identifier may comprise an application name and/or service name associated with an agent application server and/or web service, for example. Regardless of implementation, an agent identifier may comprise any information or data that may be interpreted by gateway server 102 to identify agent(s) 128 as a destination to transmit a request.

Continuing to operation 310, requestor communication manager 220 may determine whether or not an agent associated with the agent identifier is registered with the gateway server 102. Such registration may occur prior to operations described herein, and may comprise installing compatible instructions and/or a security certificate on, for example, memory 214 of agent(s) 128. Upon registration of agent(s) 128, gateway server 102 may receive an agent identifier, as described herein, to store on memory 214. Returning to operation 310, requestor communication manager 220 may determine if an agent is registered by accessing registered agent identifiers on memory 214. In an instance in which an agent identifier received from a requestor 104 is not associated with a registered agent, at operation 312, requestor communication manager 220 may return an error to requestor 104 indicating that agent 128 is unregistered and the request may not be processed.

In instances in which an agent is determined to be registered, at operation 320, gateway server 102, and, in particular, the requestor communication manager 220, may generate a correlation identifier to associate with the request. The correlation identifier may be a unique identifier associated with the request and may assist the requestor communication manager 220 in returning a response to the correct requestor 104. At operation 322, requestor communication manager 220 may add the request, agent identifier, and/or correlation identifier as a request item to a request queue. Gateway server 102 may comprise one or more request queues, in which case a request queue may be associated with an agent 128. The request queue(s) may be stored on memory 214 of gateway server 102. Additionally or alternatively, a request item may be saved to any other data structure on memory such as memory 214. In some embodiments, a request item may not be saved to persistent memory, and operation 322 may be skipped.

At operation 326, requestor communication manager 220 may query a response queue for a response with the same correlation identifier as generated for the request. The response queue and process of queuing responses is described in further detail with respect to FIG. 3B. If a corresponding response is identified in a response queue, at operation 328, the requestor communication manager 220 may remove the response from the queue and route the response to the requestor 104 that awaits a response.

According to some embodiments, a request item may remain in a request queue until a corresponding response is received by gateway server 102. Continuing to operation 330, if a request item remains in a queue longer than a specified time, requestor communication manager 220 may remove a timed out request item from the request queue, such as illustrated by operation 332, and/or transmit an error back to the requestor 104 that originated the request, such as illustrated by operation 312. In some embodiments, a request item may be removed from a queue, but a corresponding response may not be received within a specified time frame. In this scenario, requestor communication manager 220 may transmit an error back to the requestor, but may not need to make any further updates to the request queue.

Such an error may be transmitted by communication interface 218. The specified time used by processor 212, for example, to determine that a request timeout has occurred, may be predefined, dynamically determined by processor 212, and/or retrieved from memory 214.

FIG. 3B illustrates a process, which may occur asynchronously from the process illustrated in FIG. 3A, whereby gateway server 102, and, in particular, the agent communication manager 222, may manage communication to and from agent(s) 128. At operation 350, agent communication manager 222 may receive an agent message from an agent 128, via communication interface 218, for example. As illustrated by operation 352, an agent message may be a response or a polling message to ask agent communication manager 222 if there is any work to do, or, for example, if there are any unanswered requests intended for the agent 128 waiting in a request queue.

As illustrated by operation 354, in an instance in which agent 128 has transmitted a polling message, agent communication manager 222 may query a request queue for a request item intended for the polling agent 128. In this regard, agent communication manager 222 may determine that a request item is intended for a specific agent 128 based on the agent identifier associated with the request item, and/or by the queue the request item is in, in instances where request queues correspond to a specific agent. At operation 360, if a request item for the agent is present in a queue, agent communication manager 222 may remove the request item from the queue. At operation 370, agent communication manager 222 may transmit, or route the request and correlation identifier associated with the removed request item to agent 128. Such a transmission may occur via communication interface 218.

Returning to operation 354, if agent communication manager 222 determines there is no work for an agent 128, in response to the agent's polling message, at operation 372, agent communication manager 222 may message agent 128, via communication interface 218, to let the agent know there is no work to do.

Returning to operation 352, if agent communication manager 222 receives a response from an agent 128, the gateway server may add the response, comprising an answer and correlation identifier, to a response queue, as illustrated by operation 380. An answer may comprise requested data, a confirmation that an update has occurred, and/or any other answer or response to a request. According to some embodiments, an agent response may comprise a security certificate processed by gateway server 102 to validate the response is from the expected agent 128. Once the response has been added to a queue, agent communication manager 222 may determine, at operation 354, whether additional requests are waiting for a response from the agent and proceed accordingly, as described above.

While not shown, in another example embodiment, the agent communication manager may not wait to receive a polling message from the agent before transmitting a request to that agent. Instead, the agent communication manager may transmit the request upon determining that a request intended for that agent has been placed in a queue (e.g., a queue associated with that agent). In one embodiment, the polling technique illustrated in FIG. 3B may be used when the gateway server and agent are communicating via HTTPS and/or comet, whereas the latter scenario may be implemented when the gateway server and agent are communicating via WebSocket or Reverse HTTP.

Processes such as those illustrated by FIG. 3A and FIG. 3B may be performed asynchronously. As such, a requestor communication manager 220 may be configured to perform operations of FIG. 3A independently from an agent communication manager 222 configured to perform operations of FIG. 3B, and the two asynchronous processes running on gateway server 102 may provide a method of communication between requestor(s) 104 and agent(s) 128.

Moving on to FIG. 4, which illustrates operations performed by an agent 128 in accordance with some embodiments, at operation 400, an agent 128 may receive, via communication interface 218, for example, a request and a correlation identifier. The request may be formatted such that it may be interpreted by agent 128. Processor 212 of agent 128 may, at operation 410, perform an operation associated with the request that may comprise retrieving or updating data on some apparatus of private data center 120.

At operation 420, agent 128 may transmit a response to gateway server 102 via communication interface 218. The response may comprise an answer, such as requested data and/or confirmation of an operation, a correlation identifier, and/or a security certificate. At operation 430, agent 128 may save any information regarding the request and/or response to an audit log, on memory 214, for example. The information saved to the audit log may comprise date and time stamps, unique identifiers associated with requests and/or responses, copies of data retrieved and/or updated, Internet Protocol addresses or other identifiers of request originators, and/or any information associated with the request and/or response. Such an audit log may be useful in determining and/or analyzing data usage in private data center(s) 120.

FIG. 5 is a block diagram according to an example embodiment, also illustrating operations according to example embodiment that may be performed in conjunction with operations of FIGS. 3A, 3B and 4. The diagram illustrates a cloud data center 106 comprising a requestor 104 and gateway server 102 as well as a private data center 120 comprising an agent 128. The operations illustrated show how the apparatuses may perform some operations described herein utilizing HTTPS and/or Comet protocol. At operation 500, gateway server 102, via communication interface 218 may receive a request from a requestor 104, as described with respect to operation 300 of FIG. 3A, such as "get name(4)", which may, in this example indicate a request for a name of a customer number 4. At operation 510, an agent 128, via communication interface 218, may poll gateway server 102 to see if there are any pending requests, or more particularly, if there are any unanswered requests in a request queue, intended for agent 128. In this regard, agent 128 may repeatedly transmit HTTPS messages, or requests, to gateway server 102. If processor 212 of gateway server 102 determines there is an unanswered request intended for the polling agent 128 in a request queue, at operation 520, gateway server 102, via communication interface 218, may transmit an HTTPS message, or response, indicating the data request, such as, in this example, "get name(4)," and the associated correlation identifier, such as, "1234." In this regard, operation 520 may be exemplary of operation 340. At operation 530, in accordance with operation 420, communication interface 218 of agent 128 may transmit an HTTPS message, or request, comprising an answer to the request ("John"), correlation id "1234," and/or a security certificate. At operation 540, gateway server 102 may transmit, via communication interface 218, an HTTPS message, or response, as confirmation of receiving the answer from agent 128. At operation 550, such as in operation 328, gateway server 102, via communication interface 218, may transmit the answer to the appropriate requestor 104.

The operations of FIG. 5 are provided as a non-limiting example embodiment that may be implemented using HTTPS and/or Comet, but it will be appreciated that embodiments described herein may be implemented by a variety of methods and/or protocols. Another example implementation of embodiments described herein may utilize WebSocket and/or reverse HTTP for the connection between agent 108 and gateway server 102.

FIGS. 3A, 3B, 4, and 5 illustrate operations of a method, apparatus, and computer program product according to some example embodiments. It will be understood that each operation of the flowcharts or diagrams, and combinations of operations in the flowcharts or diagrams, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may comprise one or more memory devices of a computing device (for example, the memory 214) storing instructions executable by a processor in the computing device (for example, by the processor 212, requestor communication manager 220, or agent communication manager 222). In some example embodiments, the computer program instructions of the computer program product(s) which embody the procedures described above may be stored by memory devices of a plurality of computing devices. As will be appreciated, any such computer program product may be loaded onto a computer or other programmable apparatus (for example, gateway server 102, agent 128, and/or other apparatus) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, gateway server 102, agent 128, and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method comprising:
receiving a request and an agent identifier from a requestor;
generating, by a processor, a correlation identifier associated with the request;
asynchronously adding the request, agent identifier, and associated correlation identifier as a request item to a request queue associated with the agent identifier, wherein the request queue is identified from a plurality of request queues, each associated with a respective agent;
retrieving the request item from the request queue and routing the request and associated correlation identifier to an agent associated with the agent identifier associated with the request queue from which the request item was retrieved;
receiving an agent response comprising an answer and the correlation identifier;
adding the agent response to a response queue;
retrieving the agent response from a response queue; and
transmitting the answer associated with the agent response to a requestor based on the correlation identifier associated with the agent response;
wherein the receiving the request, the generating of the correlation identifier, and the transmitting of the answer are performed asynchronously from the routing of the request and the receiving of the agent response.

2. A method according to claim 1, wherein the agent response further comprises a security certificate identifying a registered agent.

3. A method according to claim 1, further comprising transmitting an error response to a requestor in an instance when a response to a request is not received within a specified time limit.

4. A method according to claim 1, further comprising transmitting an error response to a requestor in an instance when an agent identifier is not registered.

5. A method according to claim 1, wherein
the request and associated correlation identifier is routed to the agent in the form of a hypertext transfer protocol secure response, in response to a polling hypertext transfer protocol secure request received from the agent; and
the agent response is received as a hypertext transfer protocol secure request.

6. A method according to claim 1, wherein the request and associated correlation identifier is routed to the agent via a WebSocket connection and the agent response is received via the WebSocket connection.

7. A method according to claim 1, wherein the agent identifier comprises at least one of a customer identifier, application name, or service name.

8. A computer program product comprising at least one non-transitory computer-readable medium having computer-readable program instructions stored therein, the computer-readable program instructions comprising instructions, which when performed by an apparatus, are configured to cause the apparatus to at least:
receive a request and an agent identifier from a requestor;
generate a correlation identifier associated with the request;
asynchronously add the request, agent identifier, and associated correlation identifier as a request item to a request queue associated with the agent identifier, wherein the request queue is identified from a plurality of request queues, each associated with a respective agent;
retrieve the request item from the request queue and route the request and associated correlation identifier to an agent associated with the agent identifier associated with the request queue from which the request item was retrieved;
receive an agent response comprising an answer and the correlation identifier;
add the agent response to a response queue;
retrieve the agent response from a response queue; and
transmit the answer associated with the agent response to a requestor based on the correlation identifier associated with the agent response; and
wherein the receiving the request, the generating of the correlation identifier, and the transmitting of the answer are performed asynchronously from the routing of the request and the receiving of the agent response.

9. A method comprising:
managing communication with a requestor asynchronously from managing communication with an agent,
wherein managing communication with the requestor comprises:
receiving a request and an agent identifier from a requestor;
generating, by a processor, a correlation identifier associated with the request;
adding the request, agent identifier, and associated correlation identifier as a request item to a request queue associated with the agent identifier, wherein the request queue is identified from a plurality of request queues, each associated with a respective agent;
asynchronously from the adding the request, determining that an agent response comprising the correlation identifier has been received in a response queue;
retrieving the agent response from the response queue; and
transmitting an answer associated with the agent response to the requestor based on the correlation identifier associated with the agent response; and
wherein managing communication with the agent comprises:
determining that a request comprising an agent identifier associated with the agent has been received in the request queue;
retrieving the request item from the request queue;

transmitting the request and the associated correlation identifier to the agent associated with the agent identifier;

receiving an agent response comprising an answer and the correlation identifier; and adding the agent response to the response queue.

10. An apparatus for processing data requests, the apparatus comprising:

processing circuitry configured to manage communication with a requestor, said processing circuitry configured to cause the apparatus to at least:

receive a request and an agent identifier from a requestor;

generate a correlation identifier associated with the request;

add the request, agent identifier, and associated correlation identifier as a request item to a request queue associated with the agent identifier, wherein the request queue is identified from a plurality of request queues, each associated with a respective agent;

asynchronously from the adding the request, determine that an agent response comprising the correlation identifier has been received in a response queue;

retrieve the agent response from the response queue; and transmit an answer associated with the agent response to the requestor based on the correlation identifier associated with the agent response; and processing circuitry configured to manage communication with an agent, said processing circuitry configured to cause the apparatus to at least:

determine that a request comprising an agent identifier associated with the agent has been received in the request queue;

retrieve the request item from the request queue;

transmit the request and the associated correlation identifier to the agent associated with the agent identifier;

receive an agent response comprising an answer and the correlation identifier; and add the agent response to the response queue.

* * * * *